(12) United States Patent
Middleton (10) Patent No.: US 7,406,331 B2
(45) Date of Patent: Jul. 29, 2008

(54) USE OF MULTI-FUNCTION SWITCHES FOR CAMERA ZOOM FUNCTIONALITY ON A MOBILE PHONE

(75) Inventor: David Desmond Middleton, Morrisville, NC (US)

(73) Assignee: Sony Ericsson Mobile Communications AB (SE)

( * ) Notice: Subject to any disclaimer, the term of this patent is extended or adjusted under 35 U.S.C. 154(b) by 1261 days.

(21) Appl. No.: 10/463,072

(22) Filed: Jun. 17, 2003

(65) Prior Publication Data

US 2004/0259590 A1  Dec. 23, 2004

(51) Int. Cl.
*H04M 1/00* (2006.01)
*H04N 7/14* (2006.01)

(52) U.S. Cl. .............. 455/556.1; 455/550.1; 455/557; 345/168

(58) Field of Classification Search .............. 455/556.1, 455/556.2, 557; 348/14.01–14.09, 14.11, 348/14.12, 14.13; 3/333.06, 373, 376; 345/169, 345/168, 172, 173
See application file for complete search history.

(56) References Cited

U.S. PATENT DOCUMENTS 6,788,737 B1 * 9/2004 Miyoshi et al. ............. 375/219

2002/0015102 A1  2/2002 Itoh et al.
2003/0038778 A1  2/2003 Noguera
2004/0233173 A1 * 11/2004 Bryant ....................... 345/169

FOREIGN PATENT DOCUMENTS

| JP | 08251564 A | * | 9/1996 |
| JP | 11102332 A | * | 4/1999 |
| JP | 11187468 A | * | 7/1999 |
| JP | 2000156812 A | * | 6/2000 |
| JP | 2002320129 A | * | 10/2002 |

* cited by examiner

*Primary Examiner*—Melur Ramakrishnaiah
(74) *Attorney, Agent, or Firm*—Coats & Bennett, P.L.L.C.

(57) ABSTRACT

A combination mobile communication device and camera that combines a hand-held mobile terminal and camera in the same physical package is described herein. The combination mobile communication device and camera uses one or more multi-function controls to control communication functions and camera functions. A user selectively places the device in either a communication mode for engaging in wireless communication with a remote device, or in a camera mode for capturing and/or viewing images. A multi-function control disposed on a side of the combination mobile communication device and camera comprises a multi-directional button that controls a communication function, such as the volume of the speaker, when the device is in a communication mode. When the device is in a camera mode, the multi-function control is used as a zoom control.

54 Claims, 5 Drawing Sheets

USE OF MULTI-FUNCTION SWITCHES FOR CAMERA ZOOM FUNCTIONALITY ON A MOBILE PHONE

BACKGROUND OF THE INVENTION

The present invention relates generally to mobile communication devices having a built-in camera and, more particularly, to multi-function controls for such devices.

In recent years, mobile communication devices with built-in cameras have been introduced into the market. One such device, referred to herein as a camera phone, combines a cellular telephone with a camera into a single package. Consumers can use their camera phones to capture images, send and receive digital images, and/or participate in a video teleconference. Until recently, the demand for mobile communication devices with built-in cameras has not been very high because such advanced features have been prohibitively expensive. However, as the costs decrease, wireless manufacturers expect the demand for such devices to increase.

To meet this growing demand and to entice new consumers, manufacturers regularly explore ways to improve camera phones. One area of concern involves designing ergonomic controls for both communication and camera functions. Current camera phones are typically held in a vertical orientation for both communication and camera functions. Though convenient for communications, this vertical orientation makes it awkward for consumers to take pictures because consumers are accustomed to conventional cameras, which have a horizontal orientation.

The location of camera controls is another concern. Currently, the majority of mobile communication device controls are located on the front panel of the mobile communication device. While locating the controls on the front panel is convenient for communication functions, such controls are awkward and difficult to use with a horizontally oriented camera phone. Therefore, it is desirable to devise a camera phone that operates in a vertical orientation for communication functions and in a horizontal orientation for camera functions with conveniently located controls for both communication and camera functions.

Another design challenge for manufacturers of camera phones is to minimize the size of a mobile communication device while providing new functions. In general, adding new features, such as a camera, to an existing mobile communication device, increases the size of the mobile communication device. Because increases in size are undesirable, designers try to find ways to implement new features without unduly increasing the size of the device.

Therefore, there is a need for a camera phone that has ergonomic camera controls and that can be held in a horizontal orientation when used in a camera mode. Also, it is desirable to provide a camera in a mobile communication device without unduly increasing the size of the mobile communication device.

SUMMARY OF THE INVENTION

The present invention relates to controls for a combination mobile communication device and camera that combines a hand-held mobile terminal and camera in the same physical package. The user selectively places the device in either a communication mode for engaging in wireless communications with a remote device, or a camera mode for taking and/or viewing images. The combination mobile communication device and camera includes a multi-function control disposed on one side of the housing. When the device is in a communication mode, the multi-function control is used to control a communication function, such as the volume of the speaker. When the device is in a camera mode, the multi-function control is used as a zoom control. The multi-function control may comprise a multi-directional button.

DETAILED DESCRIPTION OF THE INVENTION

Figure 1:
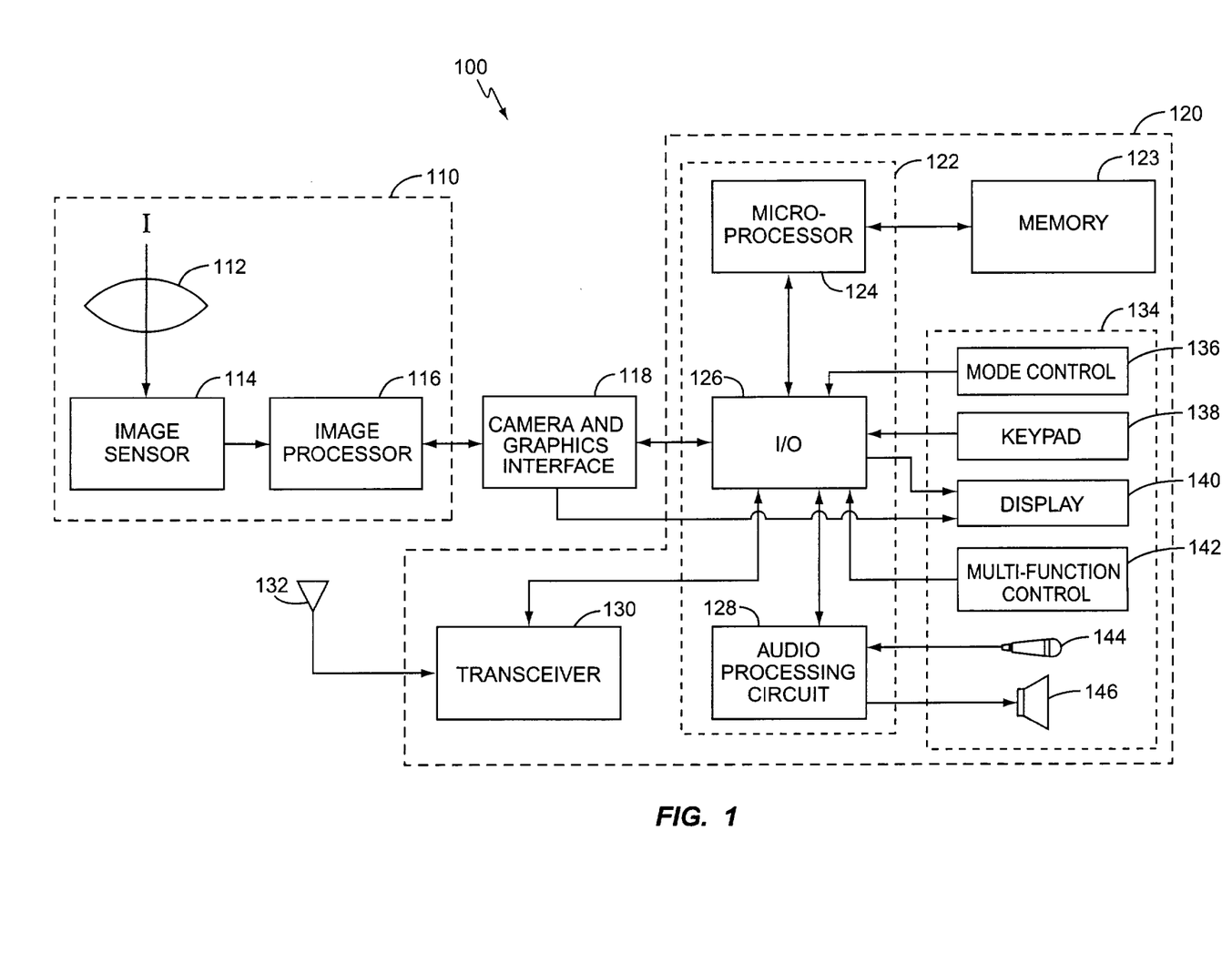
FIG. 1 is a block diagram of an exemplary camera phone according to the present invention.

FIG. 1 is a block diagram of an exemplary combination mobile communication device and camera according to the present invention. The exemplary embodiment combines a cellular telephone and camera into the same physical package, and is referred to herein as camera phone 100. The present invention is not, however, limited to a camera phone and may be embodied in other mobile communication devices that incorporate a camera. Such mobile communication devices may include cellular telephones, satellite telephones, personal communication services (PCS) devices, personal data assistants (PDAs), palm-top computers, and the like.

Camera phone 100 comprises a camera assembly 110, camera and graphics interface 118, and a communication circuit 120. Camera assembly 110 includes lens assembly 112, image sensor 114, and image processor 116. Lens assembly 112, comprising a single lens or a plurality of lenses, collects and focuses light onto image sensor 114. Image sensor 114 captures images formed by light collected and focused by lens assembly 112. Image sensor 114 may be any conventional image sensor 114, such as a charge-coupled device (CCD) or a complementary metal oxide semiconductor (CMOS) image sensor. Image processor 116 processes raw image data captured by image sensor 114 for subsequent storage in memory 123, output to a display 140, and/or for transmission by communication circuit 120. The image processor 116 may be a conventional digital signal processor programmed to process image data, which is well known in the art.

Image processor 116 interfaces with communication circuit 120 via camera and graphics interface 118. Communication circuit 120 comprises microprocessor 124, memory 123, input/output circuit 126, audio processing circuit 128, transceiver 130, antenna 132, and user interface 134. Microprocessor 124 controls the operation of camera phone 100 according to programs stored in memory 123. The control functions may be implemented in a single microprocessor, or in multiple microprocessors. Suitable microprocessors may include, for example, both general purpose and special purpose microprocessors and digital signal processors. Memory 123 represents the entire hierarchy of memory in a mobile communication device, and may include both random access memory (RAM) and read-only memory (ROM). Computer program instructions and data required for operation are stored in non-volatile memory, such as EPROM, EEPROM, and/or flash memory, which may be implemented as discrete devices, stacked devices, or integrated with microprocessor 124. Microprocessor 124, input/output circuit 126, audio processing circuit 128, and/or memory 123 may be incorporated into a specially designed application-specific integrated circuit (ASIC) 122.

Figure 2:
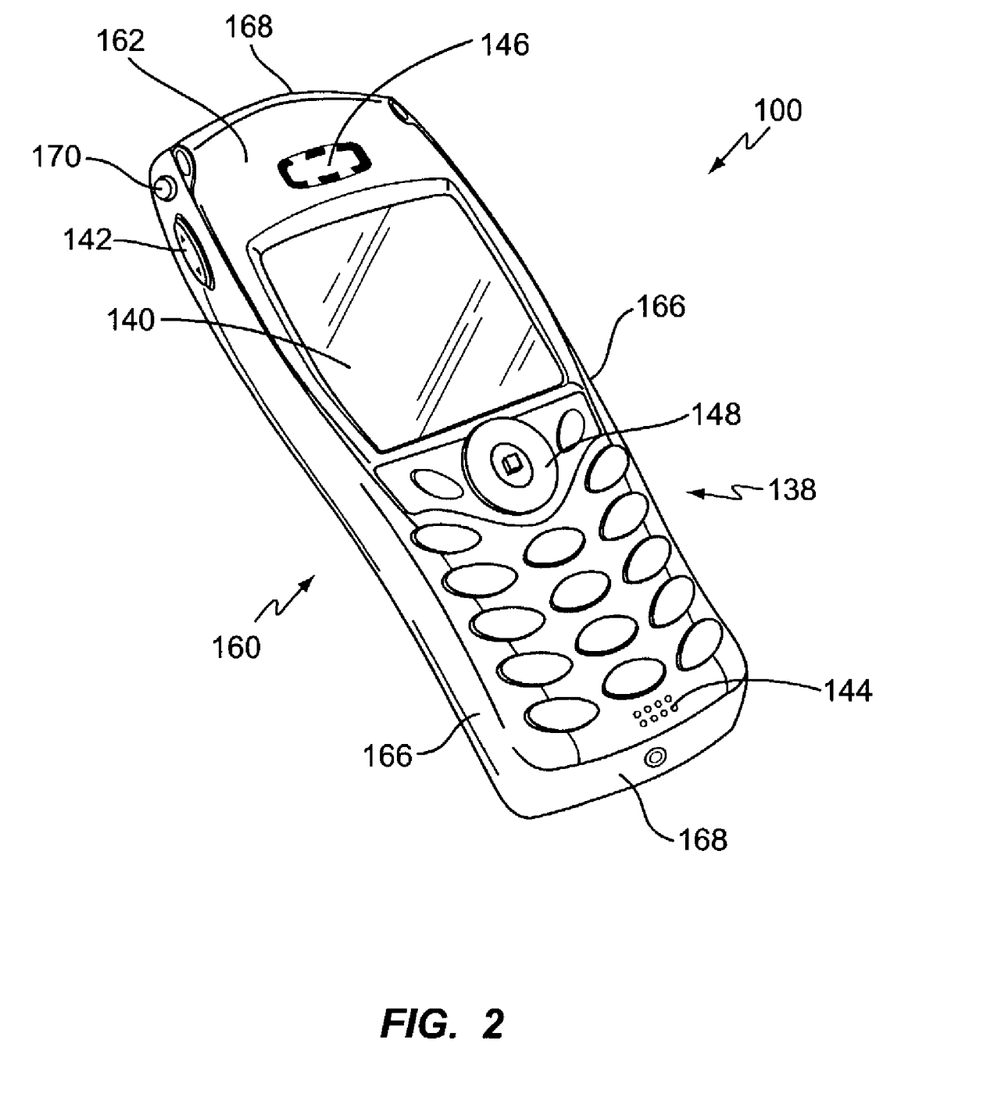
FIG. 2 is a perspective view of an exemplary camera phone as seen from the front.

Input/output circuit 126 interfaces microprocessor 124 with image processor 116 of camera assembly 110 via camera and graphics interface 118. Camera and graphics interface 118 may also interface image processor 116 with user interface 134 according to any method known in the art. While the camera and graphics interface 118 is shown as a separated component in FIG. 1, it will be understood that camera and graphics interface 118 may be incorporated with input/output circuit 126. In addition, input/output circuit 126 interfaces microprocessor 124, transceiver 130, audio processing circuit 128, and user interface 134 of communication circuit 120. User interface 134 includes a keypad 138, display 140, microphone 144, and speaker 146. Keypad 138, disposed on a front face of camera phone 100 as seen in FIG. 2, includes an alphanumeric keypad and, optionally, a navigation control, such as joystick control 148 (FIG. 2) as is well known in the art. Keypad 138 and joystick control 148 allow the operator to dial numbers, enter commands, and select options. Display 140 allows the operator to see dialed digits, images, called status, menu options, and other service information. Microphone 144 converts the user's speech into electrical audio signals and speaker 146 converts audio signals into audible signals that can be heard by the user. Audio processing circuit 128 provides basic analog output signals to speaker 146 and accepts analog audio inputs from microphone 144. Transceiver 130 is coupled to antenna 132 for receiving and transmitting signals. Transceiver 130 is a fully functional cellular radio transceiver, which may operate according to any known standard, including the standards known generally as the Global System for Mobile Communications (GSM), TIA/EIA-136, cdmaOne, cdma2000, UMTS, and Wideband CDMA.

User interface 134 also includes mode control 136 and multi-function control 142. Mode control 136 selectively activates an operational mode for camera phone 100. The operational modes may include, for example, a communication mode and a camera mode. A camera mode is defined as the mode where camera phone 100 selectively captures, displays, stores, and/or manipulates images. The camera mode may include both an image capture mode, where camera phone 100 captures, displays, and/or stores external images, and an image review mode, where camera phone 100 retrieves, displays, sends/uploads, and/or manipulates stored images. A communication mode is defined as the mode where camera phone 100 operates as a wireless communication device capable of transmitting and receiving data in a wireless communication system. Exemplary mode controls 136 are discussed further below.

Multi-function control 142 serves to control mode dependent functions of camera phone 100. The present invention utilizes multi-function control 142 to control a communication function when camera phone 100 is in a communication mode, and to control a zoom function (optical or digital zoom) when camera phone 100 is in a camera mode. As well known in the art, the zoom control controls the size of the image that is captured or displayed, and therefore, controls the magnification of the image. Zooming in magnifies the image and zooming out reduces the magnification of the image. In image capture mode, the zoom control controls the magnification of the image that is captured. In image review mode, the zoom control controls the magnification of the image displayed on the display 140. A displayed image may comprise an external image captured by camera assembly 110 or an image previously stored in memory 123. The images stored in memory 123 may comprise images previously captured by camera assembly 110, images received by communication circuit 120, or images preloaded into memory 123.

Generally, the center point of a stored image serves as the focal point of the image and remains at the center of the display as the user zooms in and out on a stored image in image review mode. However, the camera phone 100 may include a control to allow the user to change the focal point of a stored image from the center point to another selected point on the image. For example, joystick control 148 on the front 162 of camera phone 100 may be used to change the focal point of the image. Scroll bars or other similar controls could also be used to pan across an image and thereby change the focal point. In either case, the zoom control maintains the selected focal point at the center of the display as the user zooms in and out on the image.

In the exemplary embodiment, multi-function control 142 controls volume when camera phone 100 is in a communication mode. While the present invention is described in terms of communication volume control, those skilled in the art will recognize that the multi-function control may control other communication functions in the communication mode. For example, the multi-function control 142 may function as a communication quality control enabling a user to select a communication data rate or a modulation technique to improve the performance of a wireless connection. Alternatively, multi-function control 142 may operate as a menu control for scrolling through menu options displayed on display 140. Multiple implementations for multi-function control 142 are discussed further below.

Figure 3:
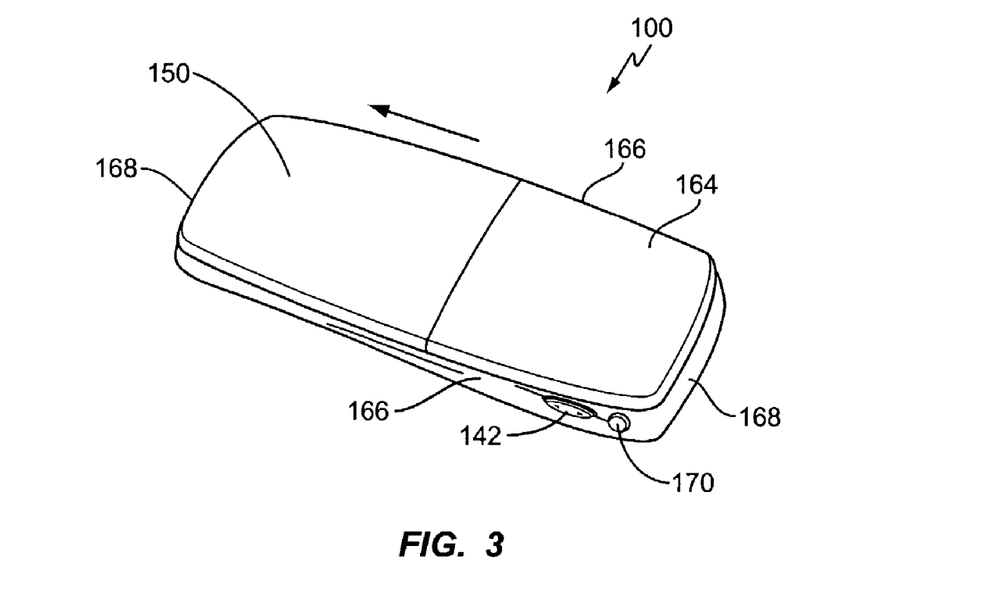
FIG. 3 is a perspective view of an exemplary camera phone as seen from the rear.
Figure 4:
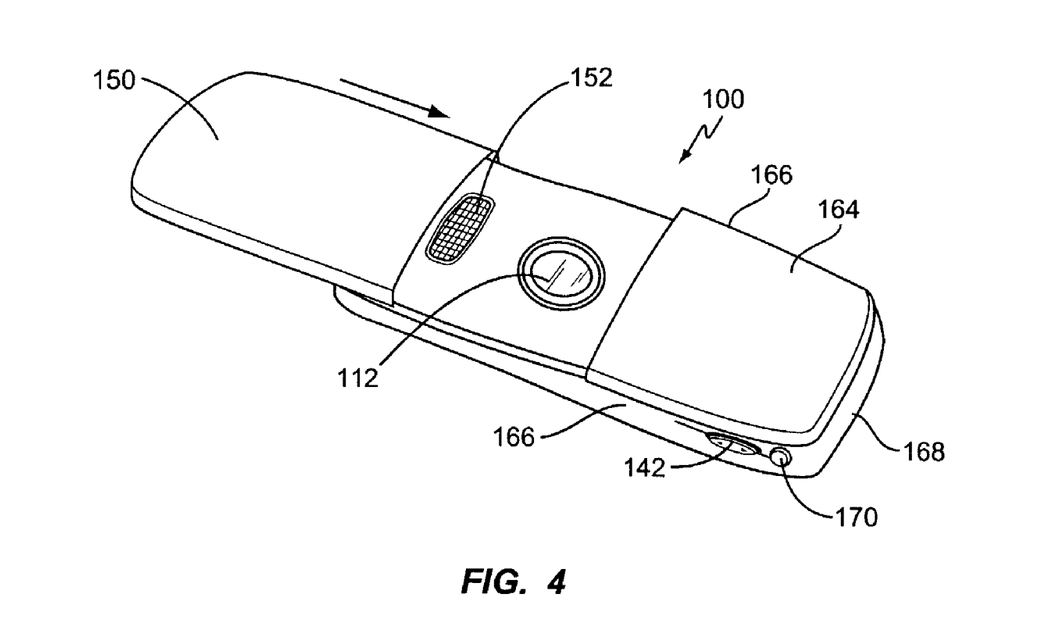
FIG. 4 is a perspective of an exemplary camera phone with a rear mode control panel.

FIGS. 2-4 illustrate an exemplary camera phone 100 according to the present invention. The camera phone 100 includes a housing 160 having a front 162, a back 164, right and left sides 166, and top and bottom ends 168. The keypad 138, display 140, microphone 144, and speaker 146 are disposed on the front 162 of housing 160 as seen best in FIG. 2. The back 164 of housing 160 may include a sliding panel 150 to conceal the lens assembly 112 and a flash 152. FIG. 3 shows the sliding panel 150 in a closed position, while FIG. 4 shows the sliding panel 150 in an open position. In a preferred embodiment of the invention, a switch or sensor (not shown) serving as mode control 136 detects the position of the sliding panel 150 and generates a mode control signal to control the operating mode of the camera phone 100. The microprocessor 124 is responsive to the signal generated by mode control 136 and activates the desired operating mode in response to the mode control signal. For example, when the sliding panel 150 is in the closed position, the communication mode is selected and when the sliding panel 150 is in the open position the camera mode is selected.

The exemplary camera phone 100 illustrated in FIG. 2 includes a multi-function control 142 on a side 166 of the camera phone 100. In the embodiment shown in FIGS. 2-4, the multi-function control 142 comprises a momentary contact rocker switch. The multi-function control 142 is located adjacent an upper end of the camera phone 100 on the left side 166 when viewed from the front 162. This location allows the user to easily manipulate the multi-function control 142 with the thumb or index finger while talking in a communication mode to control the speaker volume. This location is also ideal for a camera zoom control. A shutter control 170 may also be disposed adjacent the multi-function control 142.

When camera phone 100 is in communication mode, the camera phone 100 is positioned in a substantially vertical orientation. A user can easily manipulate multi-directional control 142 with, for example, the index finger, to control the volume of camera phone 100, as is well known in the art. When camera phone 100 is in an image-capturing mode, the camera phone 100 is held in a substantially horizontal orientation. In this mode, a user may manipulate multi-function control 142 to zoom in or out on a scene while viewing the scene on the display 140. In an image review mode, the user may hold the camera phone 100 in his or her palm to review stored images. Multi-function control 142 can also be manipulated with the index finger to zoom in and out on stored images while manipulating the joystick control 148 with the thumb to control the focal point of the image. By co-locating the zoom control with the volume control, camera phone 100 now has an ergonomic control applicable to both communication and camera functions that does not increase the size or weight of the camera phone 100.

Figure 5A:
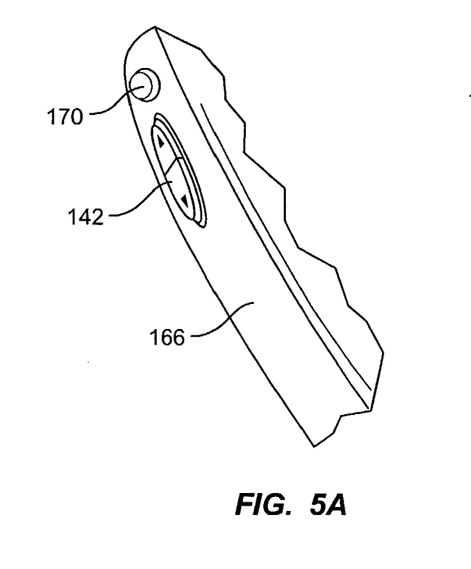
FIGS. 5A-5D illustrate exemplary multi-function controls of the camera phone of FIG. 1.
Figure 5B:
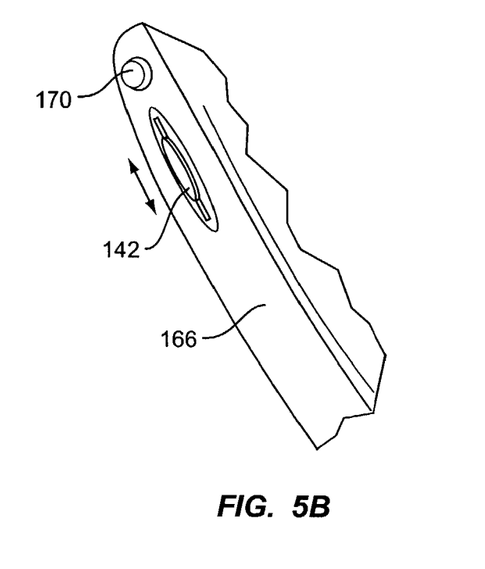
Figure 5C:
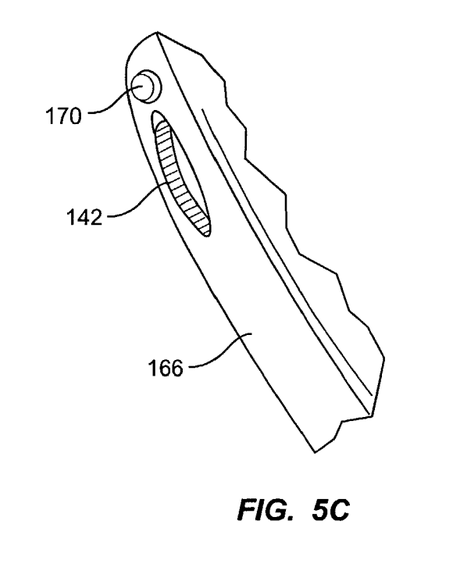

FIGS. 5A-5D illustrate several examples of multi-function controls 142 suitable for the present invention. FIG. 5A shows two separate momentary contact push buttons that provide up/down volume control in the communication mode and in/out zoom control in the camera mode. FIG. 5B illustrates a momentary contact slide control used as a multi-function control 142. Moving slide control up or down increases or decreases the volume when camera phone 100 is in communication mode and zooms displayed images in or out when camera phone 100 is in camera mode. FIG. 5C illustrates a thumbwheel switch used as a multi-function control 142. Rotating thumbwheel switch in a first direction increases the volume in a communications mode or zooms in an image in camera mode. Rotating thumbwheel switch in the opposite direction decreases the volume in a communication mode or zooms out in a camera mode. Thumbwheel switch may also include a push button function that could be used to control the shutter, thereby eliminating the need for a separate shutter control 170.

Figure 5D:
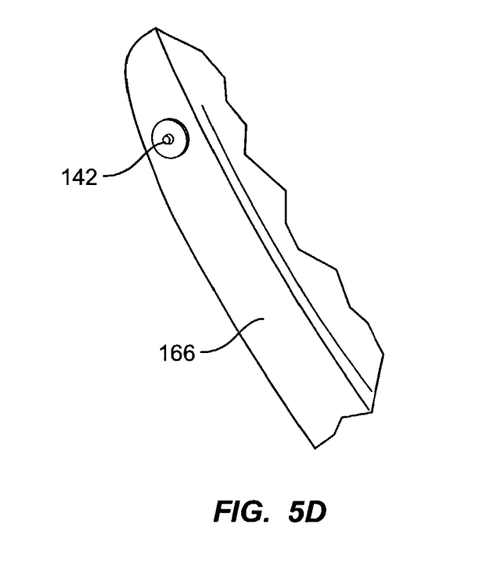

While all of the multi-function controls 142 discussed so far are varieties of bi-directional controls, the present invention is not so limited. For example, FIG. 5D illustrates a joystick control used as a multi-function control 142. Moving the joystick in a first direction increases volume in a communication mode or zooms in an image in camera mode. Moving the joystick in a second direction decreases the volume in a communication mode or zooms out in a camera mode when in communication mode and zooms in or out when in camera mode. The joystick control may also control a plurality of communication and/or camera functions in addition to the volume and zoom control described above. For example, a user may use the joystick control to locate and select a focal point on a displayed image in an image-viewing mode. In addition, the joystick control may include a push button function. The push button function can be used, for example, as a shutter control when camera phone 100 is in image capture mode, or to send a captured image via communication circuit 120 to another wireless subscriber, an email address, etc., without leaving the camera mode.

Figure 6A:
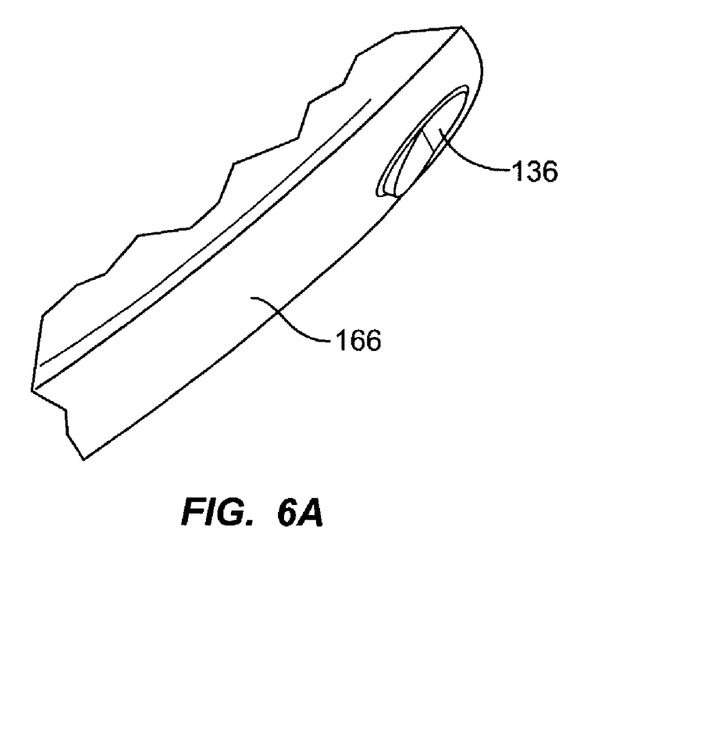
FIGS. 6A and 6B illustrate exemplary mode controls for the camera phone of FIG. 1.
Figure 6B:
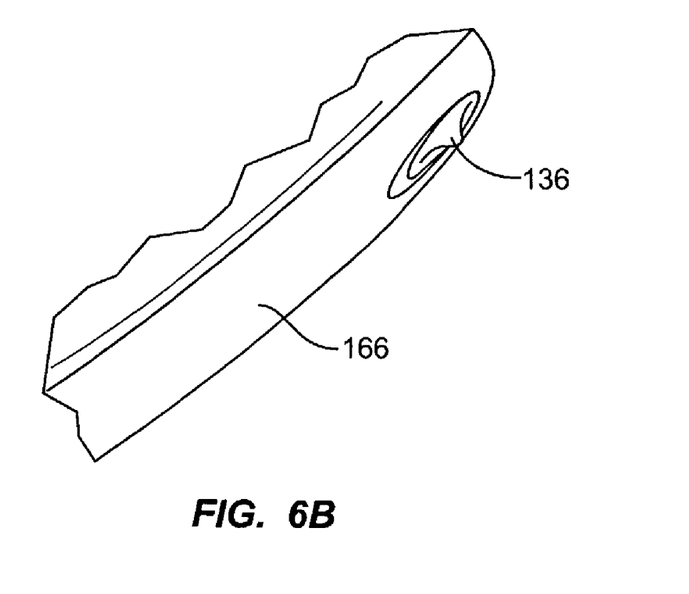

In order for multi-function control 142 to control the appropriate function, camera phone 100 needs to be able to distinguish between communication and camera modes. As discussed above, camera phone 100 may select the appropriate mode depending on the position of sliding panel 150. Alternatively, camera phone 100 may include a separate mode control switch 136 located on the housing 160. FIGS. 6A and 6B illustrate exemplary mode control switches 136 located on the right side 166 of the housing 160 as viewed from the front 162. FIG. 6A illustrates a rocker switch 136 used as a mode control switch 136. FIG. 6B illustrates a slide switch 136 used as a mode control switch 136. Camera phone 100 may also include other mode control methods. For example, the keypad 138 and display 140 may be used to select the operating mode from an on-screen menu. Also, camera phone 100 may include an orientation sensor that detects the general orientation of camera phone 100. When the orientation sensor detects a substantially vertical orientation, camera phone 100 operates as a communication device. When the orientation sensor detects a substantially horizontal orientation, camera phone 100 operates as a camera. In addition, keypad 138 may include a camera key that when pressed (or pressed and held) acts as a mode switch. This key may also be co-located with the shutter control or be a separate additional key on side 166 or top 168 of housing 160.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A combination mobile communication device and camera comprising:
    a housing comprising a front, a back, and sides;
    a communication circuit disposed within said housing for transmitting and receiving signals when in a communication mode;
    a camera assembly disposed within said housing for selectively capturing and storing an image when in a camera mode, said camera assembly including a zoom function;
    a display screen to display a saved image in an image review mode;
    a multi-function control disposed on one of said sides of said housing for controlling said zoom function for said camera assembly when in said camera modes, for controlling a communication circuit function when in said communication mode, and for scaling a displayed image in said image review mode while maintaining a selected focal point at the center of said display screen.

2. The combination mobile communication device and camera of claim 1 wherein said multi-function control operates as a volume control for said communication circuit when in said communication mode.

3. The combination mobile communication device and camera of claim 1 wherein said multi-function control further controls a shutter function for said camera assembly when in said camera mode.

4. The combination mobile communication device and camera of claim 1 wherein said multi-function control comprises a slide control.

5. The combination mobile communication device and camera of claim 1 wherein said multi-function control comprises a dial control.

6. The combination mobile communication device and camera of claim 1 wherein said multi-function control comprises a multi-directional control button.

7. The combination mobile communication device and camera of claim 6 wherein said multi-directional control button includes a select option.

8. The combination mobile communication device and camera of claim 7 wherein said select option activates a shutter control of said camera when in said camera mode.

9. The combination mobile communication device and camera of claim 7 wherein said select option saves an image to memory when in said camera mode.

10. The combination mobile communication device and camera of claim 7 wherein said select option activates transmission of said image via said communication circuit.

11. The combination mobile communication device and camera of claim 1 further comprising mode control means for selectively activating said communication and camera modes.

12. The combination mobile communication device and camera of claim 11 wherein said mode control means comprises a menu option selected via a keypad on said housing.

13. The combination mobile communication device and camera of claim 11 wherein said mode control means comprises a toggle button disposed on said housing for changing modes.

14. The combination mobile communication device and camera of claim 11 wherein said mode control means comprises a slide switch disposed on said housing for selectively activating said camera and communication modes.

15. The combination mobile communication device and camera of claim 11 wherein said mode control means comprises a detection circuit for detecting a position of a movable component that is moved to selectively activate said camera and communication modes.

16. The combination mobile communication device and camera of claim 15 wherein said movable component comprises a sliding panel covering a camera lens on said back of said housing for selectively activating said camera and communication modes.

17. The combination mobile communication device and camera of claim 16 wherein said sliding panel activates said camera mode when opened and activates said communication mode when closed.

18. The combination mobile communication device and camera of claim 11 wherein said mode control means comprises an orientation sensor for detecting an orientation of said combination mobile communication device and camera.

19. The combination mobile communication device and camera of claim 18 wherein said mode control means activates said camera mode when said orientation sensor detects a substantially horizontal orientation, and wherein said mode control means activates said communication mode when said orientation sensor detects a substantially vertical orientation.

20. The combination mobile communication device and camera of claim 1 wherein said multi-function control operates as a screen control for said display screen of said wireless communication system when in said communication mode.

21. The combination mobile communication device and camera of claim 1 wherein said camera mode comprises an image capturing mode.

22. The combination mobile communication device and camera of claim 21 wherein said multi-function control operates to change a size of an external image displayed on said display screen in said image capturing mode.

23. The combination mobile communication device and camera of claim 21 wherein, in said image review mode, said multi-function control operates to change a size of a stored image displayed on said display screen.

24. The combination mobile communication device and camera of claim 1 wherein said multi-function control operates as a quality control for controlling the quality of wireless communications when in said communication mode.

25. The combination mobile communication device and camera of claim 24 wherein said quality control controls a communication data rate.

26. The combination mobile communication device and camera of claim 24 wherein said quality control controls a communication modulation technique.

27. The combination mobile communication device and camera of claim 1 wherein said multi-function control operates as a menu control for said communication circuit when in said communication mode.

28. The combination mobile communication device and camera of claim 1 further comprising a shutter control disposed on said housing.

29. The combination mobile communication device and camera of claim 1 wherein said zoom function comprises a digital zoom function.

30. The combination mobile communication device and camera of claim 1 wherein said zoom function comprises an optical zoom function.

31. A method of controlling a combination mobile communication device and camera including a housing, a communication circuit, and a camera assembly, the method comprising:
    selectively activating one of an image capture mode, an image review mode, and a communication mode;
    using a multi-function control disposed on said housing as a zoom control for said camera assembly when in one of said image capture mode and said image review mode;
    using said multi-function control to control a communication function of said communication circuit when in said communication mode; and
    using said multi-function control to scale an image while maintaining a selected focal point at the center of a display screen when in said image review mode.

32. The method of claim 31 wherein selectively activating one of said image capture mode, said image review mode, and said communication mode comprises selecting a menu option via a keypad disposed on said housing.

33. The method of claim 31 wherein selectively activating one of said image capture mode, said image review mode, and said communication mode comprises toggling between said image capture mode, said image review mode, and said communication mode via a toggle button disposed on said housing.

34. The method of claim 31 wherein selectively activating one of said said image capture mode, said image review mode, and said communication mode comprises activating a switch disposed on said housing.

35. The method of claim 31 wherein selectively activating one of said image capture mode, said image review mode, and said communication mode comprises detecting a position of a movable component disposed on said housing.

36. The method of claim 35 wherein detecting the position of a movable component comprises detecting a position of a sliding panel covering a camera lens on said housing.

37. The method of claim 36 wherein detecting the position of said sliding panel comprises detecting an open position of said sliding panel to activate one of said image capture mode and said image review mode, and detecting a closed position of said sliding panel to activate said communication mode.

38. The method of claim 31 wherein selectively activating one of said image capture, image review, and communication modes comprises rotating said housing such that an orientation sensor disposed in said housing detects a substantially vertical or a substantially horizontal orientation.

39. The method of claim 38 wherein detecting said substantially vertical orientation activates said communication mode and wherein detecting said substantially horizontal orientation activates one of said image capture mode and said image review mode.

40. The method of claim 31 wherein using said multi-function control to control a communication function comprises using the multi-function control as a volume control.

41. The method of claim 31 wherein using said multi-function control to control a communication function comprises using said multi-function control to control said display screen of said combination mobile communication device and camera.

42. The method of claim 31 further comprising using said multi-function control as a zoom control for said camera assembly when in said image capture mode to change a size of an external image displayed on said display screen of said combination mobile communication device and camera.

43. The method of claim 31 further comprising using said multi-function control as a zoom control for said camera assembly when in said image review mode to change a size of a stored image displayed on said display screen of said combination mobile communication device and camera.

44. The method of claim 31 wherein using said multi-function control to control a communication function comprises using said multi-function control as a menu control.

45. The method of claim 31 wherein using said multi-function control to control a communication function comprises using said multi-function control to control communication quality associated with said communication circuit.

46. The method of claim 45 wherein controlling said communication quality comprises controlling a communication data rate.

47. The method of claim 45 wherein controlling said communication quality comprises controlling a communication modulation technique.

48. The method of claim 31 wherein using said multi-function control further comprises activating a select option of said multi-function control.

49. The method of claim 48 wherein activating said select option in said image capture mode activates a shutter control.

50. The method of claim 48 wherein activating said select option in one of said image capture mode and said image review mode activates transmission of an image via said communication circuit.

51. The method of claim 48 wherein activating said select option in said communication mode selects a communication function.

52. The method of claim 31 wherein using said multi-function control as a zoom control when in one of said image capture mode and said image review mode comprises using said multi-function control as a digital zoom control when in one of said image capture mode and said image review mode.

53. The method of claim 31 wherein using said multi-function control as a zoom control when in one of said image capture mode and said image review mode comprises using said multi-function control as an optical zoom control when in one of said image capture mode and said image review mode.

54. A camera phone comprising:
a housing comprising a front, a back, and sides;
a communication circuit disposed within said housing for transmitting and receiving signals when in a communication mode;
a camera assembly disposed within said housing for selectively capturing, displaying, storing, and manipulating an image when in a camera mode, said camera assembly including a zoom function;
a multi-directional control button disposed on one of said sides of said housing for controlling said zoom function for said camera assembly when in said camera mode and for controlling a volume associated with said communication circuit when in said communication mode;
a detection circuit for detecting a position of a sliding panel covering a camera lens on said back of said housing for selectively activating said communication and camera modes.

* * * * *